May 22, 1956

O. J. BORROWDALE 2,746,617

DEVICE FOR FACILITATING THE UNLOADING
OF MATERIAL FROM A HOPPER

Filed July 23, 1953

INVENTOR.
Orville J. Borrowdale
BY
Gary, Desmond & Parker
attys

May 22, 1956  O. J. BORROWDALE  2,746,617
DEVICE FOR FACILITATING THE UNLOADING
OF MATERIAL FROM A HOPPER
Filed July 23, 1953  10 Sheets-Sheet 6

INVENTOR.
Orville J. Borrowdale
BY
Davy, Desmond & Parker
Att'ys.

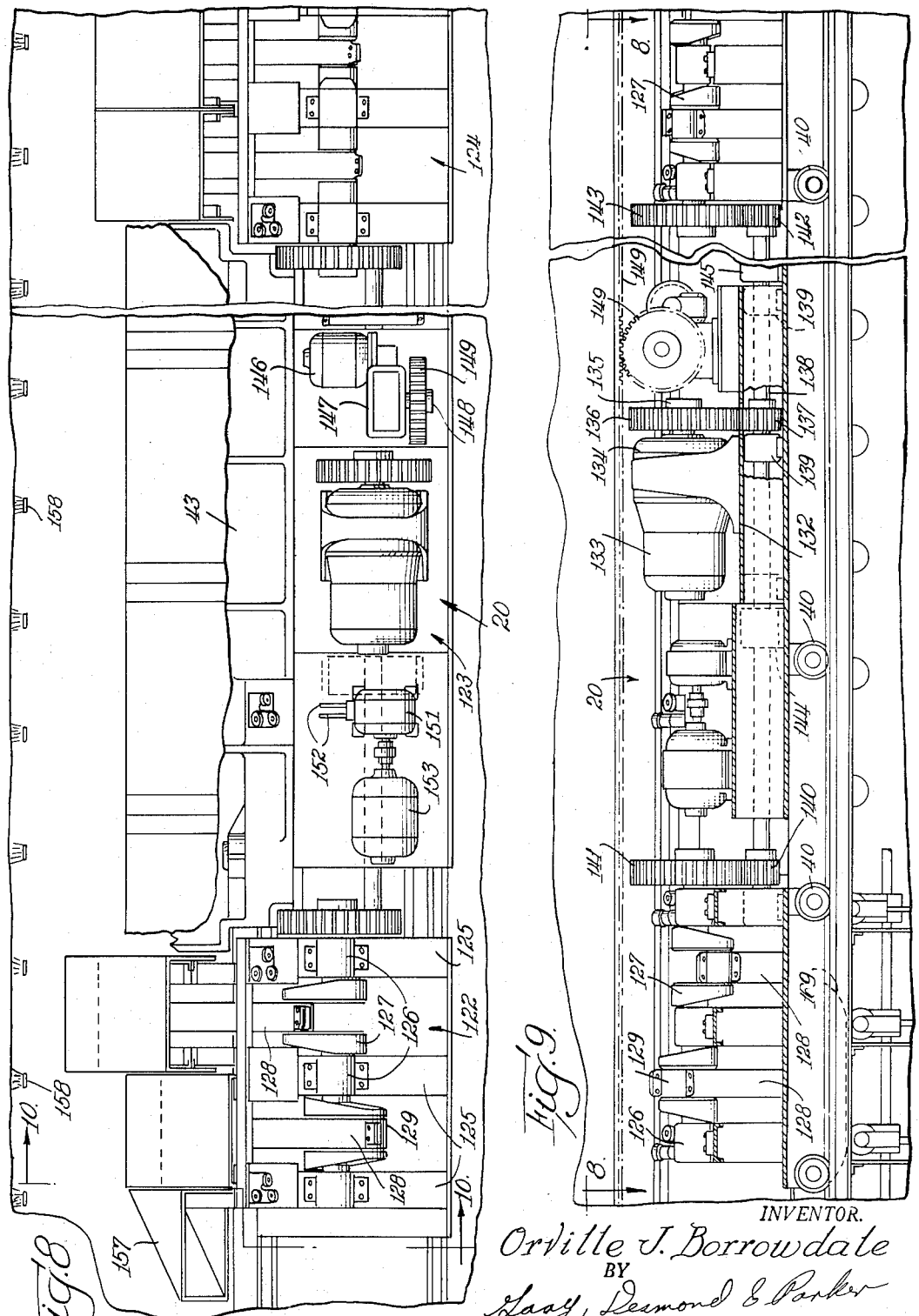

May 22, 1956     O. J. BORROWDALE     2,746,617
DEVICE FOR FACILITATING THE UNLOADING
OF MATERIAL FROM A HOPPER

Filed July 23, 1953     10 Sheets-Sheet 8

INVENTOR.
Orville J. Borrowdale
BY
Gary, Desmond & Parker
Att'ys.

May 22, 1956
O. J. BORROWDALE
2,746,617
DEVICE FOR FACILITATING THE UNLOADING
OF MATERIAL FROM A HOPPER
Filed July 23, 1953
10 Sheets-Sheet 9
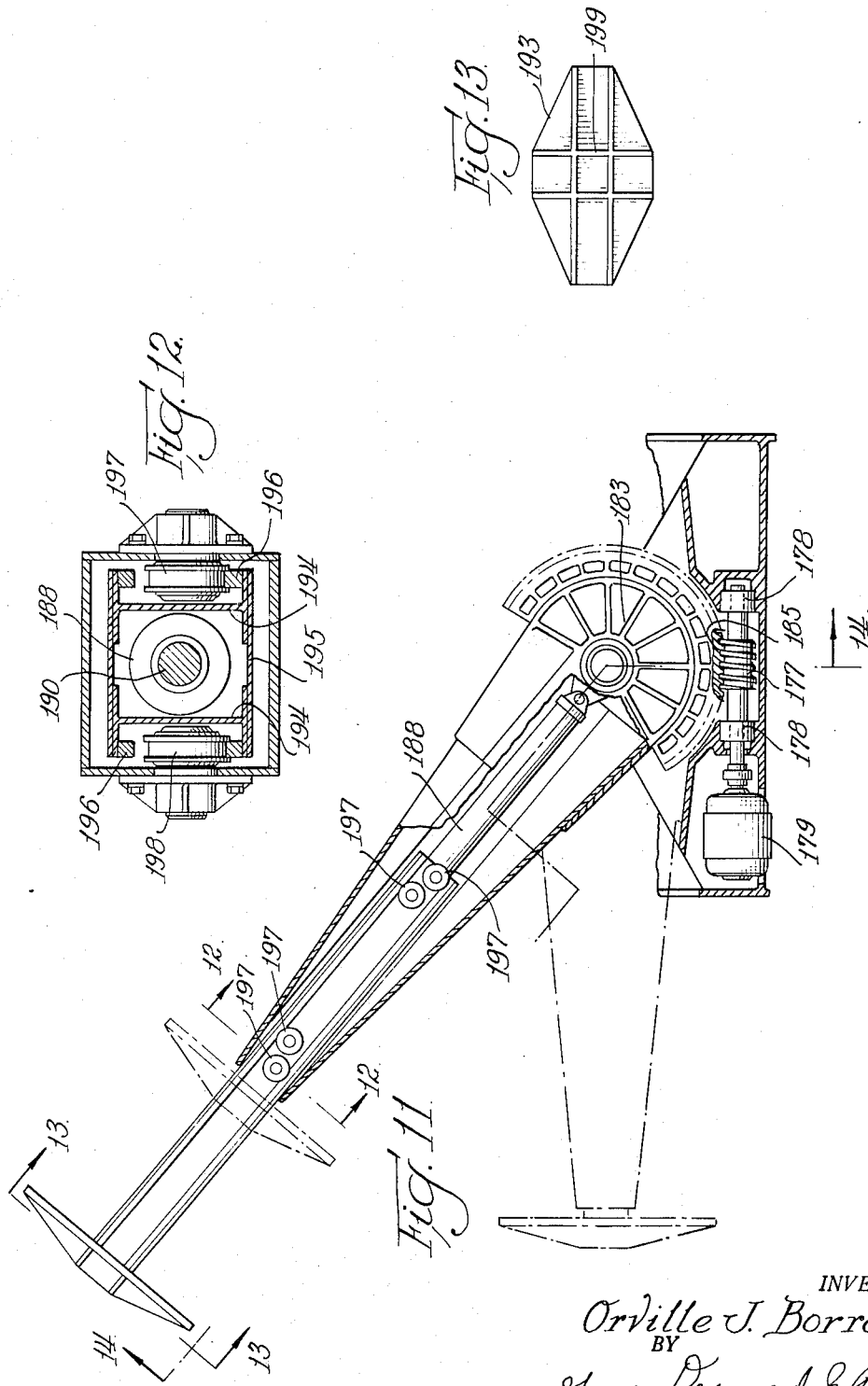
INVENTOR.
Orville J. Borrowdale
BY
Gary, Desmond & Parker
Attys

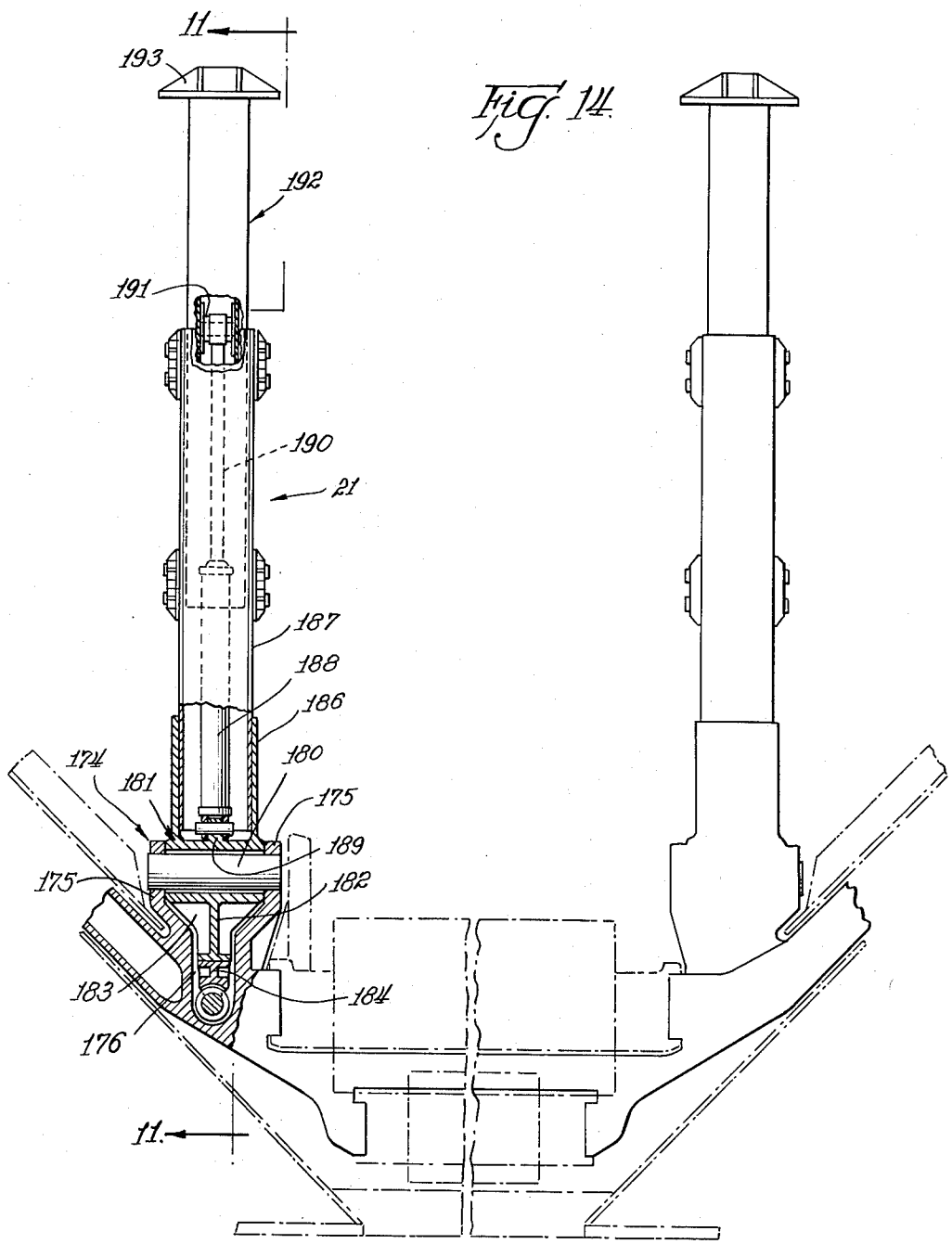

United States Patent Office 2,746,617
Patented May 22, 1956

2,746,617
DEVICE FOR FACILITATING THE UNLOADING OF MATERIAL FROM A HOPPER
Orville J. Borrowdale, Chicago, Ill.
Application July 23, 1953, Serial No. 369,898
18 Claims. (Cl. 214—17)

This invention relates to improvements in an apparatus for facilitating the unloading of hoppers and refers particularly to an apparatus for agitating the material in a hopper and accelerating the flow of said material from the hopper during unloading of the hopper.

In the transportation and storage of such materials as ore, coal, sand and the like, hoppers are employed to hold the material. The hoppers employed are usually of inverted triangular cross-section and are relatively elongated, the discharge of the hopper being at the bottom thereof and being substantially coextensive with the length of the hopper. Such hoppers are frequently employed in cargo-carrying ships and, although the present invention is not to be limited to this environment, the present invention will be described in conjunction with the cargo-carrying hopper of a ship.

When hoppers of the type described are unloaded from the bottom, the rate of unloading is dependent upon the ability of the material carried by the hopper to flow under the influence of gravity. There is a tendency, however, depending upon the nature of the material for the material to pack or jam in the hopper, particularly at the lower portion thereof adjacent the hopper discharge. Hence, the flow of the material from a hopper is unpredictable and in many instances the material will not flow at all unless it is agitated, pushed or scraped by expedients heretofore employed. Such expedients are usually makeshift and in many instances the unloading of a hopper becomes a most awkward and difficult task.

In addition, the gravity flow of material is usually at a non-uniform and unpredictable rate. Conveyors are frequently employed beneath the hopper discharge to carry away the discharged material. Hence, with a non-uniform flow of the material from the hopper the conveyor is frequently inundated by a veritable avalanche of material at one time and is inefficiently underloaded at another time. Hence, the passage of the material on the conveyor is at an inefficient non-uniform rate.

The present invention broadly contemplates means for agitating the material in a hopper during the discharge period to condition it for flow, and in addition the invention contemplates means for accelerating and controlling the flow of material from the hopper discharge.

One aspect of the invention contemplates movable means which operates in the body of the material in the hopper adjacent the discharge of the hopper whereby the normally packed and coherent material at this situs is agitated, to condition it for accelerated flow.

Another important aspect of the present invention resides in means for scraping the inner side walls of the hopper to eliminate adherence of the material upon said side walls and propel the material toward the hopper discharge.

A further important aspect of the invention resides in the provision of a scraper mechanism for disrupting overhanging ledges of coherent material in the hopper whereby the material in the hopper will more readily flow to the hopper discharge.

Another important feature of the invention resides in means for moving the mechanisms hereinbefore described, lengthwise through the hopper adjacent the discharge thereof, means being contemplated for operating the mechanisms in either direction of travel thereof through the hopper.

A further feature of the invention resides in a hopper construction wherein a substantial portion of the mechanism for moving the device lengthwise of the hopper is shielded from the material in the hopper.

Other features of the present invention will be apparent from the accompanying drawings and following detailed description.

In the drawings,

Fig. 8 is a top plan view of the ram or scraper mechanism employed in the device, the view being taken looking in the direction of the arrows 8—8 in Fig. 9.

Fig. 9 is a side elevational view of the device shown in Fig. 8.

Fig. 11 is a sectional view of the ledge scraping device employed with the machine, said view being a section taken on line 11—11 of Fig. 14.

Fig. 12 is an enlarged detailed sectional view taken on line 12—12 of Fig. 11.

Fig. 13 is a detailed view of the scraping element looking in the direction indicated by the arrows 13—13 in Fig. 11.

Fig. 14 is a sectional view taken on the broken line 14—14 of Fig. 11.

Figure 1:
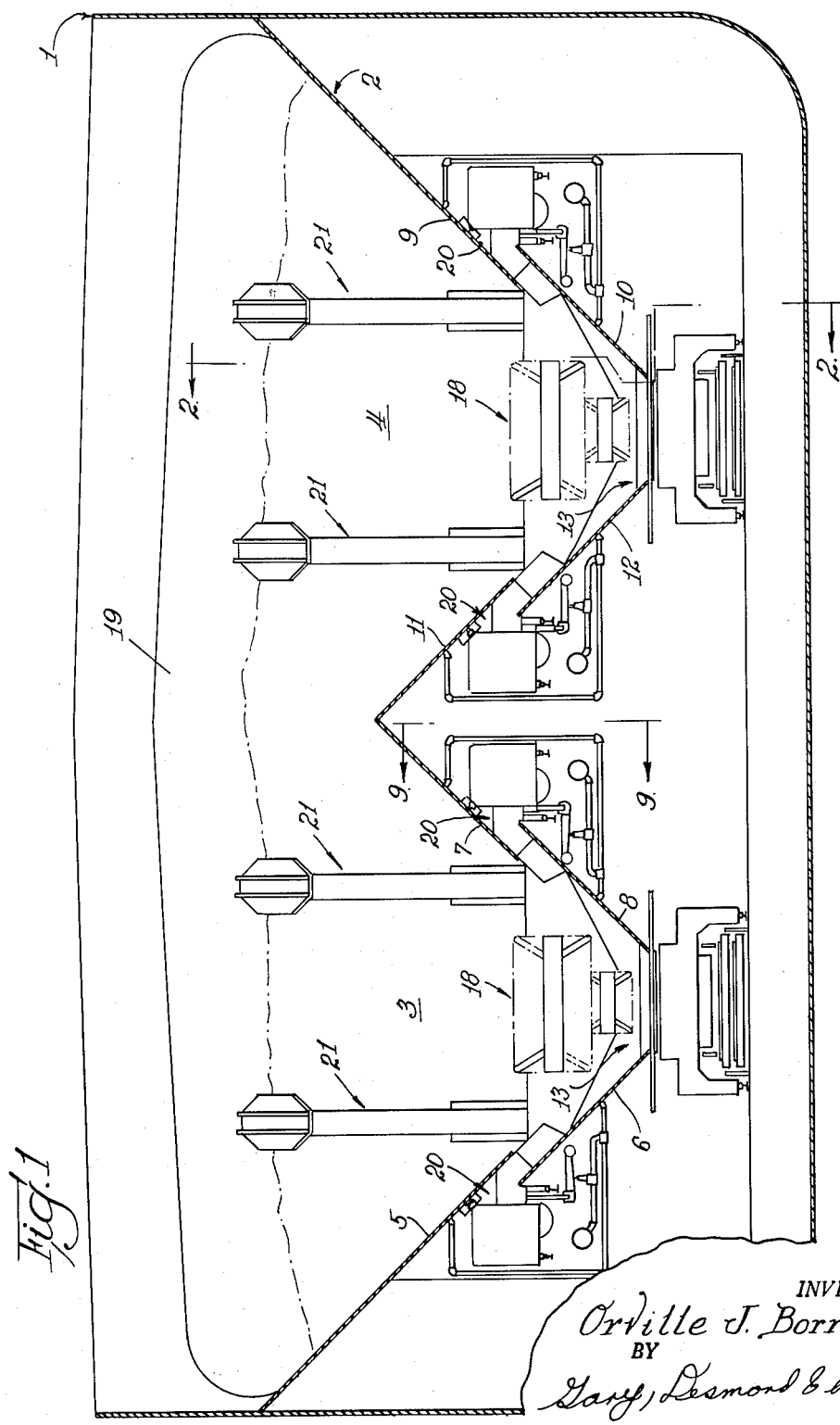
Fig. 1 is a transverse sectional view, partially diagrammatic, taken through a cargo carrying ship illustrating double V-type cargo carrying hoppers equipped with the device comprising the present invention.

Referring in detail to the drawings, 1 indicates diagrammatically the hull of a cargo carrying ship, the cargo carrying space of the ship having a hopper 2 of a double V-type. The hopper 2 comprises two relatively elongated triangular sectioned hopper spaces 3 and 4, the space 3 being laterally defined by inclined walls 5 and 6 on one side and inclined walls 7 and 8 on the opposite side. Similarly, the hopper 4 is defined laterally by inclined walls 9 and 10 on one side and inclined walls 11 and 12 on the opposite side. The hoppers 3 and 4 are identical, the inclined walls 5 and 6 being identical with the inclined walls 9 and 10 and the inclined walls 7 and 8 being identical with the inclined walls 11 and 12.

The units 3 and 4 comprising the hopper 2 are identical and each unit is provided at its bottom with an elongated discharge 13 which is defined laterally by the bottom edge portions of the walls 6 and 8 and 10 and 12. Substantially triangular sectioned brace members 14 are supported by the walls 6 and 8 and 10 and 12 respectively and extend transversely across the openings 13, the brace members 14 being spaced longitudinally along the length of the discharges 13. Between adjacent brace members 14 a pair of gates 15 are slidably positioned, the edges of said gates being positioned in grooves 16 provided in the brace members 14. Thus, each of the elongated openings 13 is divided into a plurality of smaller openings 17 which are controlled by the opposite slidable gates 15.

Each of the hopper units 3 and 4 carries an agitating unit 18 which is adapted to operate upon the body of the material 19 carried at the lower portion of the hoppers. Each of the units 3 and 4 is also provided with a pair of combination carrier and ram units 20, said combination carrier and ram units being disposed upon opposite sides of each of the hopper units 3 and 4. In addition, each of the hopper units carries a pair of ridge scraper units 21.

As has been hereinbefore described, the hopper units 3 and 4 are identical and the pairs of combination carrier and ram units 20 for each hopper unit are the same. Likewise, the ridge scraper units 21 are all alike. Accordingly, in the description of the invention only one agitating unit 18, one combination carrier and ram unit 20 and one ridge scraper unit 21 will be described, it being understood that the remaining corresponding units are of identical construction and operate in the same manner as the ones described.

In addition, an endless conveyor 22 is associated with each of the hopper units 3 and 4, the conveyor 22 being positioned beneath each discharge 13. The conveyors 22 are identical and each comprise a plurality of rolls 23 which are adapted to support an endless conveyor belt 24. Each conveyor 22 extends parallel to the elongated discharges 13 and said conveyors are adapted to receive the material discharged from the hopper units and transport said material to a desired location. Associated with each of the conveyors 22 are opposite side walls 25 supported by frame members 26, said side walls being adapted to prevent the material carried upon the upper pass of the conveyor belt 24 from spilling over the lateral sides thereof.

Further, a car 27 is associated with each of the hopper units 3 and 4, said car comprising a frame 28 having depending legs 29, said legs being adapted to carry flanged wheels 30 which roll upon spaced tracks 31. The tracks 31 are disposed on opposite sides of the conveyor 22 and in operation the car 27 moves over the conveyor 22 lengthwise along said conveyor.

The function and construction of the various elements and units hereinbefore briefly described, will be described in detail hereinafter.

Figure 5:
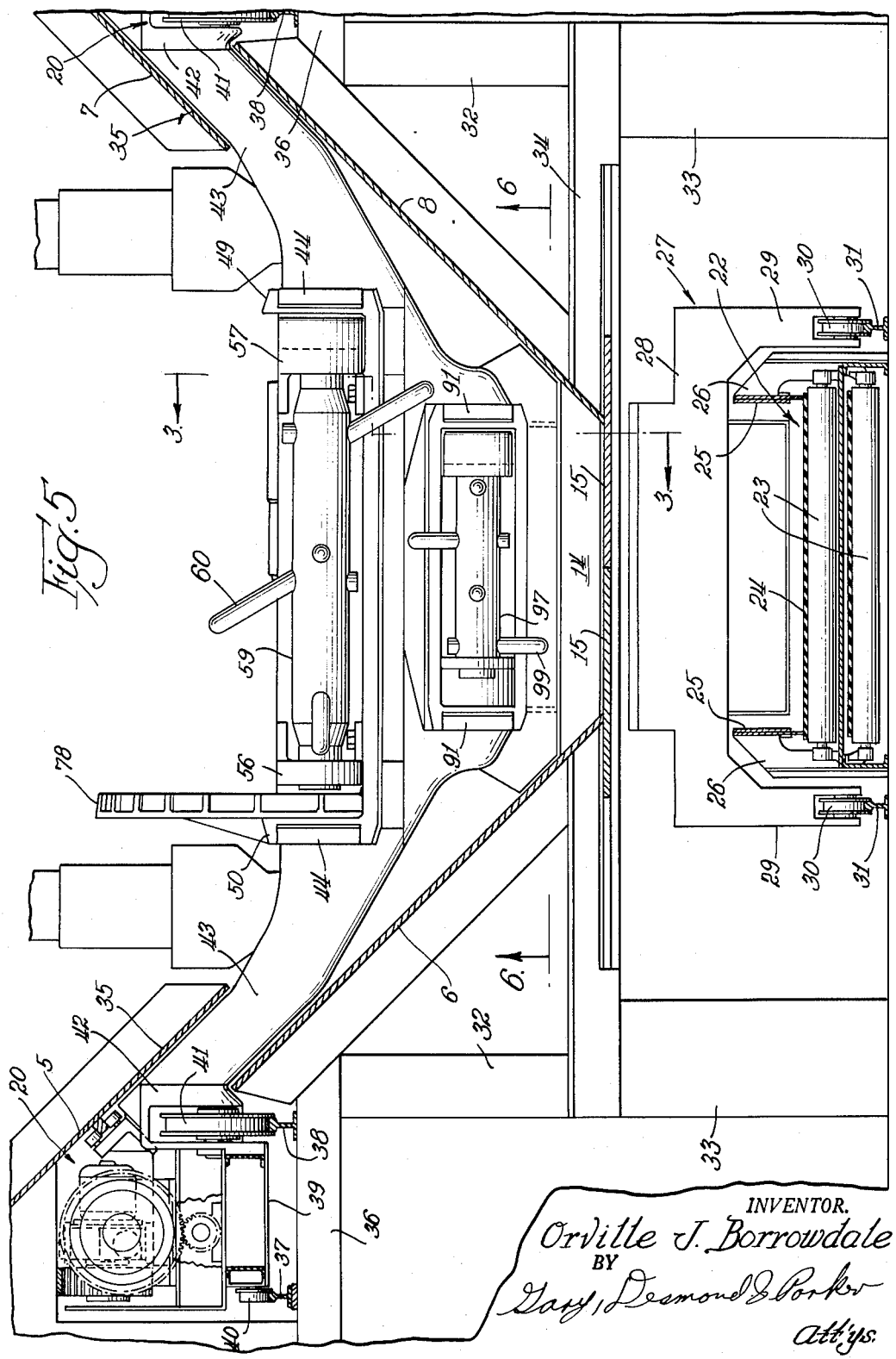
Fig. 5 is an end elevational view of the device shown in Figs. 3 and 4.

Referring particularly to Figs. 3, 4, 5 and 7, the details of the construction of the agitating units 18 are illustrated. As has been hereinbefore described the opposite lateral walls of the hopper units 3 and 4 are made in sections. Referring particularly to Fig. 5, the construction of the lower portion of the hopper unit 3 is shown. In this hopper unit the lower sections 6 and 8 of the opposite hopper walls are supported by frame members 32 which, in turn, are carried by columns 33 and cross beams 34. Both lower wall sections 6 and 8 are inclined outwardly and upwardly and adjacent their upper end portions, said sections are overlapped by the upper wall sections 5 and 7. The upper wall sections 5 and 7 are inclined at the same angle as are the lower wall sections, but are offset from said lower sections to provide an elongated space 35.

On each side of the hopper unit a substantially horizontally disposed frame 36 is carried, said frames being disposed adjacent the spaces 35 between the upper and lower wall sections. Upon each of the horizontally disposed frames 36 a pair of rails 37 and 38 are positioned, said rails being coextensive with the length of the hopper unit.

The combination carrier and ram unit 20 is adapted to be positioned above each of the horizontal frames 36 and each unit 20 comprises a box frame 39 which on one side is supported by a plurality of spaced flanged wheels 40 and on the opposite side is supported by a pair of flanged wheels 41. An extension member 42 is carried by each box frame 39 and each extension 42 at opposite sides of the hopper unit is adapted to support a depending supporting frame 43 which extends through opening 35 into the interior of the hopper. As will be hereinafter more fully described the supporting frames 43 are adapted to carry the agitating units 18 and inasmuch as said supporting frames are carried by the combination carrier and ram units, the agitating unit can be moved throughout the length of the lower portion of the hopper.

Figure 7:
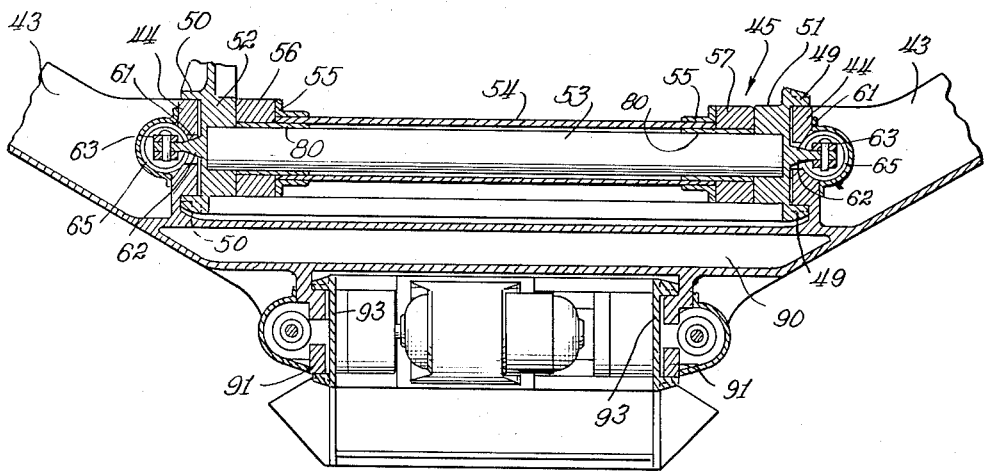
Fig. 7 is a sectional view taken on the line 7—7 of Fig. 4.

As shown best in Fig. 7 the supporting frames which extend through the opposite spaces 35 are joined together in integral fashion within the body of the hopper unit and said supporting frames are provided with oppositely spaced guide members 44. As will be hereinafter more fully described the opposite spaced guide members 44 support a slidable frame indicated generally at 45.

The slidable frame 45 comprises side members 46 and 47 which are connected together at their ends by cross members 48 whereby a rigid frame structure is formed. The side members 46 comprise spaced flanges 49 which slidably embrace one of the guide members 44 carried by one frame 43. The opposite side member 47 carries opposite flanges 50 which embrace the opposite guide member 44 carried by the opposite frame 43. The arrangement is such that the frame 45 is slidable a limited distance along the length of the guide members 44.

A boss 51 is formed integral with the side member 46 and is positioned at approximately the central portion of said side member. A similar boss 52 is formed integral with the opposite side member 47 and is disposed transversely opposite from the first mentioned boss 51. A shaft 53 is positioned in the bosses 51 and 52 and is rigidly secured thereto by means of set screws, or the like (not shown).

A tubular member 54 is positioned around the shaft 53, said member being mounted upon collars 55 which, in turn, are carried by opposite arms 56 and 57. At the opposite end of each of the arms 56 and 57, bearings are mounted for the support of a rotatable shaft 58 upon which a drum 59 is mounted. A plurality of agitating arms 60 extend outwardly from the periphery of the drum 59 and, as will be hereinafter more fully described, said arms function as pickers or agitating fingers in the agitating and disruption of the body of the material carried in the hopper.

Each guide member 44 for a portion of its length is provided with a central slot 61 through each of which a lug 62 extends. The lugs 62 are mounted upon the side members 46 and 47 of the slidable frame 45. A clevis 63 is pivotally mounted on each of the lugs 62 exteriorly of the opposite guide members 40 and each clevis is carried by a piston rod 64 which operates in a fluid pressure cylinder 65 mounted upon each side of the slidable frame 45. Each cylinder 65 is pivotally mounted as at 66 on a block 67 comprising a portion of the frame 43. Fluid connections 68 are provided at the opposite ends of each cylinder 65 whereby the piston rods 64 may be moved inwardly or outwardly with respect to the cylinders 65. As can readily be seen, when fluid under pressure is introduced into the cylinders 65, the lugs 62 and hence the opposite sides of the slidable frame are moved slidably upon the guide members 44. In this fashion the drum 59 carrying the agitating arms 60 may be moved forwardly or rearwardly with respect to the frame members 43.

In employing the agitating unit, the unit is carried by the opposite combination carriers and ram units 20 lengthwise through the hopper. The agitating unit, of course, acts upon the material at the lower portion of the hopper and it functions to agitate said material and to break any cohering or adhering condition which may exist in the material whereby it is conditioned for free flow through the discharges 13. In employing the agitating unit, the unit is moved lengthwise through the hopper with the drum 59 in a forward position, that is, the drum 59 leads the unit in the direction of motion. In order to permit the unit to function when it is moved in a rearwardly direction, means is provided for swinging the arms 56 and 57 to the position shown in dotted lines in Fig. 4 whereby the drum 59 will be in a leading or advance position when the agitating unit moves in the opposite direction. To accomplish the swingable movement of the arms 56 and 57 to dispose the drum in its dotted line position, the following described mechanism is employed.

An electric motor 69 is mounted upon the tubular housing 54. A conventional gear reducing mechanism 70 is mounted upon a cross member 71 which is connected at its opposite ends to the opposite arms 56 and 57. A pulley 72 carried by the motor shaft is adapted to drive a belt or sprocket chain 73 which is trained around a pulley 74 mounted around the input shaft of the gear reducer 70. The output shaft 75 of the gear reducer extends through an aperture 76 provided in arm 56 and said shaft carries at its end a pinion 77. A semicircular frame 78 is mounted upon the slidable member 47 comprising one side of the slidable frame. A ring gear or rack 79 is carried upon the inner face of the semicircular frame 78 and pinion 77 is adapted to mesh with the ring gear or rack.

The arrangement is such that when motor 69 is energized it will drive the pinion 77. Rotation of the pinion, the pinion being engaged with the ring gear 79, causes said pinion to move in a planetary fashion around the arcuate path defined by the ring gear and inasmuch as the pinion 77 is rigidly secured to shaft 75 which, in turn, is carried by the gear reducer 70, the arms 56 and 57 which carry the rotating drum 59 are rocked about the shaft 53. In order to facilitate this rocking action, bearings 80 are interposed between the arms 56 and 57 and shaft 53. In this fashion the drum 59 carrying the agitating arms 60 may be moved from one side of the agitating unit to the other depending upon the direction that the agitating unit moves through the hopper.

An electric motor 81 is connected to a conventional gear reducer 82 and both units are mounted upon a supporting channel member 83 which, in turn, is mounted upon the cross beam 71 which connects arms 56 and 57 together. Output shaft 84 of the gear reducer 82 carries a sprocket wheel 85 around which a sprocket chain is trained. At the end of shaft 58 which carries drum 59, a sprocket wheel 87 is mounted and the chain 86 is also trained around this sprocket wheel. In this fashion the drum 59 carrying the agitating arms 60 will be rotated by motor 81. It can readily be seen that the motor 81 and gear reducer 82 are mounted upon and move with the beam 71 and rocking arms 56 and 57, and hence when the arms 56 and 57 are rocked about shaft 53, the motor and gear reducer move with the arms.

In order to protect the driving arrangement comprising the sprocket wheels 85 and 87 and sprocket chain 86, a removable cover plate 88 is mounted upon arm 57. In addition, in order to protect the cylinder 65 and movable piston rod 64, cover member 89 is provided. The same type of cover member is positioned upon the opposite side of the device.

As has been hereinbefore described, the depending frames 43, which extend through the spaces 35 at each side of each hopper unit 3 and 4, are connected together. The means connecting the opposite frames 43 together comprises a web member 90 which is positioned beneath the slidable frame hereinbefore described. Opposite guide members 91 are positioned upon the lower face of the web 90, said guide members preferably being integral with the web member. The guide members 91 are adapted to slidably support a lower slidable frame 92.

The lower slidable frame 92 comprises opposite sides 93 and spaced cross members 94 which are joined at their ends to the end portions of the opposite sides 93. A pair of spaced arms 95 are carried by the slidable frame 92 and extend forwardly from said frame. Similarly, a pair of spaced arms 96 are carried by the slidable frame 92 and extend rearwardly from said frame. A drum 97 is journaled at the end portions of the arms 95 and a similar drum 98 is journaled in the end portions of the arms 96. Each of the drums 97 and 98 carry a plurality of spaced agitating arms 99 which are similar to and function in the same manner as the arms 60 carried by the drum 59 hereinbefore described.

A motor 100 is directly connected to a conventional gear reducer 101 and both elements are mounted upon frame member 102 which comprises a portion of the slidable frame 92. The output shaft 103 of the gear reducer 101 carries a sprocket wheel 104 around which a sprocket chain 105 is trained. The shaft upon which drum 97 is mounted carries at its end a sprocket wheel 106 over which the sprocket chain 105 is trained whereby the drum 97 may be rotated by the motor 100.

In similar fashion a motor 107 is directly connected to a gear reducer 108, both units being mounted upon the frame member 109 which comprises a portion of the slidable frame 92. Output shaft 110 of the gear reducer 108 carries a sprocket pinion 111 around which sprocket chain 112 is trained. The shaft upon which drum 98 is mounted carries at its end a sprocket wheel 113 around which chain 112 also wraps. In this fashion the drum 98 may be rotated by motor 107.

The sprocket wheels 104 and 106 and sprocket chain 105 are enclosed by means of a cover 114 and similarly sprocket wheels 111 and 113 and sprocket chain 112 are enclosed by a cover 115. In this fashion the driving mechanisms for the drums 97 and 98 are protected from damage by the material through which the agitating unit passes.

The guide members 91 are provided with slots 116 for a portion of their length. At each side of the slidable frame a lug 117, only one of which is shown, extends through a slot 116. To each lug 117 a clevis 118 is pivotally connected, said clevis being mounted upon the end of piston rod 119 which reciprocates in fluid pressure cylinder 120. The opposite end of each fluid pressure cylinder is pivotally connected to a portion of the web 90, as indicated at 121 in Fig. 6. Fluid under pressure may be introduced at either end of the cylinders 120 and as a result the piston rods 119 function to move the slidable frame upon the guide members 91.

Figure 6:
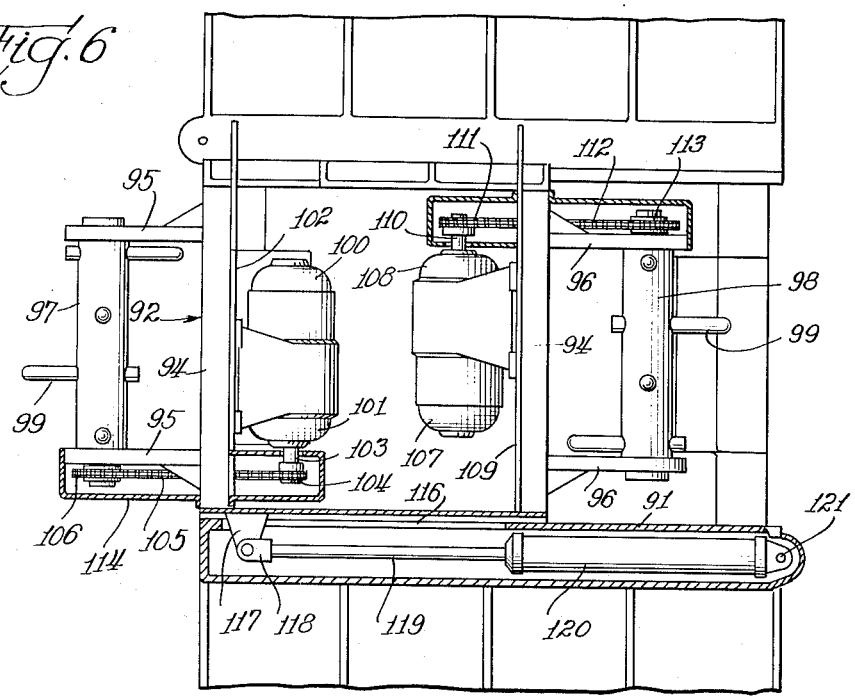
Fig. 6 is a sectional view taken on line 6—6 of Fig. 5.

As has been hereinbefore described in conjunction with the function of the drum 59 which carries the agitating arms 60, the drum 97 or 98, whichever is at the forward end of the agitating unit during movement thereof is the drum which will be rotated. Normally, the slidable frame 92 will be so positioned upon the guide members 91 that the drum which is being rotated will be extended forwardly in the direction of movement of the agitating unit. For instance, as shown in Fig. 6, the drum 97 is considered as the operating drum due to the fact that the agitating unit is assumed as moving forwardly with respect to said drum. Hence, the piston rods 119 will be so extended from the cylinders 120 that the drum 97 will be projected forwardly. If the agitating unit moves in the opposite direction, the piston rods 119 will be retracted into the cylinders 120 whereby the slidable frame will be so moved as to project the drum 98 forwardly in the direction of movement of the agitating unit.

Hence, when the agitating unit 18 is being employed, it will be moved lengthwise through the lower portion of the hopper unit, such movement being imparted thereto by means carried by the combination carriers and ram units 20. These means will be hereinafter more fully described. When the agitating unit 18 is moved in a predetermined direction, the arms 56 and 57 will be so swung as to project the drum 59 forwardly relatively to the direction of movement of the unit. Similarly, the piston rods 119 will be so manipulated as to project either the drum 97 or the drum 98 forwardly in the direction of movement of the unit and preferably the forwardly projected drum only will be rotated. Of course, it is to be understood that, if desired, both drums 97 and 98 may be rotated regardless of the direction of movement of the unit.

As has been hereinbefore described there is a tendency for the material which is carried in the hopper units 3 and 4 to pack at the lower portion of the hoppers, that is, adjacent the discharges 13. This tendency is more or less acute depending upon the nature of the material carried in the hoppers. When predetermined gates 15 are opened, it is desired that the material flow from the hopper to the conveyor 22. If the material is packed adjacent the discharges 13, the material will not flow from the hopper to the conveyor, and when this situation exists, the units 18 may be used to advantage to disrupt the material and break up the cohering condition thereof. Thus, the material will be conditioned to flow from the hopper to the conveyor. In addition, the rotating arms 60 carried upon the drum 59 and the rotating arms 99 carried by the drums 97 and 98 tend to impart to the material adjacent the discharges 13 an acceleration which assists gravity in moving the material through the hopper discharges. It can readily be seen that if the drums 59, 97 and 98 are rotated rapidly, the rate of discharge will be increased and hence the present invention contemplates rotating the drums 59, 97 and 98 at desired speeds to effect a control of the rate of passage of the material from the hopper to the conveyor.

In unloading some types of material from hoppers, such as those shown, it has been found that even though the material may be agitated and rendered free flowing immediately above the hopper discharge, the material tends to adhere to the lower side walls of the hopper. The material thus adhering to the lower side walls of the hopper forms, in effect, a foundation for the material above it. Hence, although the central portion of the body of the material in the hopper may be conditioned for ready flow, means frequently has to be employed for breaking the adherence of the material with the hopper walls to effect a complete emptying of the hopper.

As has been hereinbefore described, the unit 18 is carried by depending supporting members 43 which, in turn, are carried by the combination carrier and ram units 20. There are two such units for each hopper space 3 and 4 and, in addition to movably supporting the units 18, said carriers also movably support a plurality of ram mechanisms which, as will be hereinafter more fully described, are adapted to scrape the lower side walls 6 and 8 and 10 and 12 of the hopper spaces 3 and 4. For purposes of description, one combination carrier and ram unit 20 will be described in detail, it being understood that all of the other units are identical and function in an identical fashion.

Figure 10:
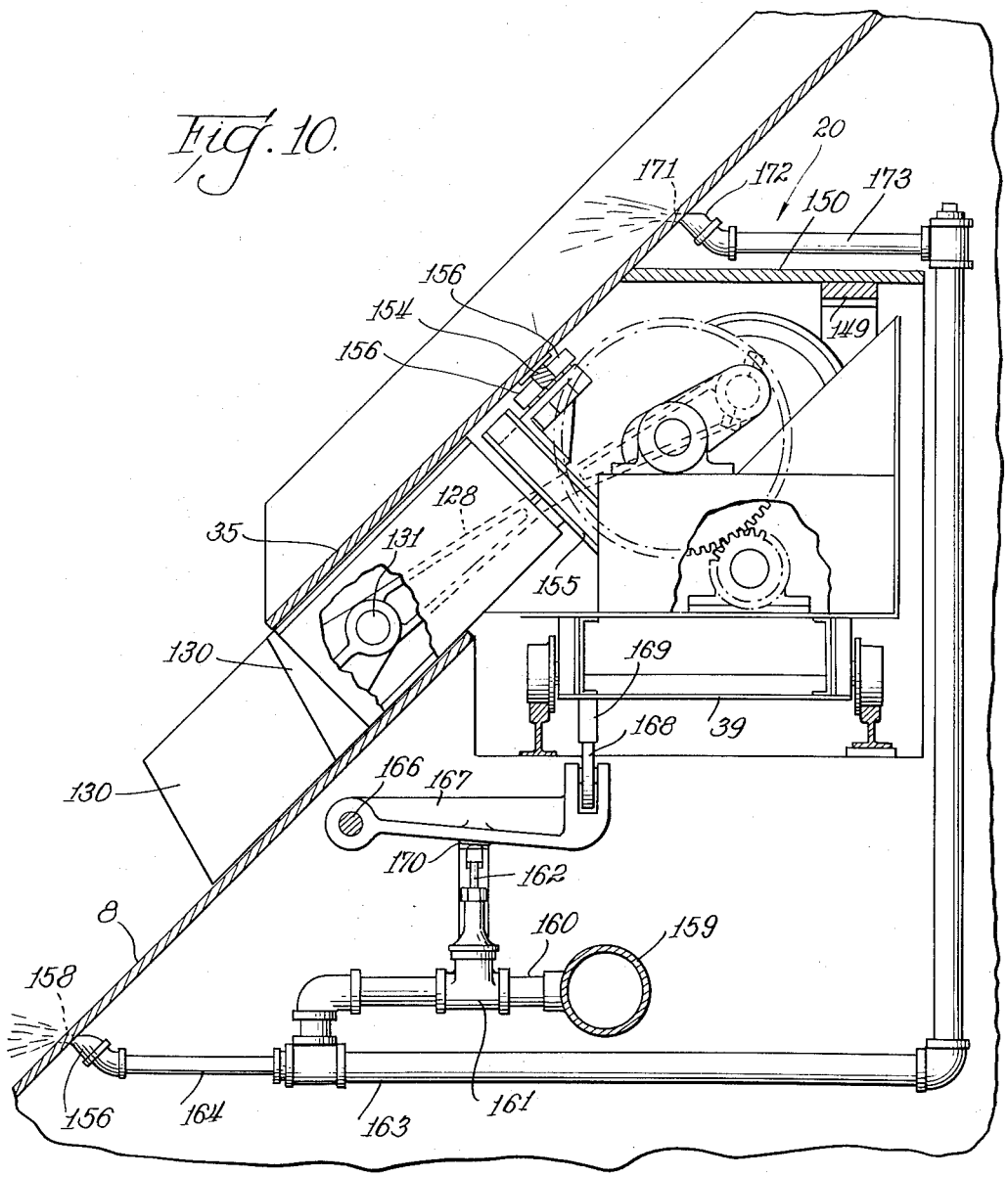
Fig. 10 is a sectional view taken on line 10—10 of Fig. 8.

Referring particularly to Figs. 8, 9 and 10 enlarged views of one of the combination carrier and ram units 20 are shown. The box frame 39 extends the entire length of the unit and carries apparatus which may be generally designated in three sections. The first section 122 comprises one of the rams; the central section 123 carries various power units, and the end section 124 comprises another ram. Section 122 and 124 are identical in construction and only one of them will be described in detail, it being understood that all similar sections of all the combination carrier and ram units 20 are the same.

The ram section 122 comprises a plurality of spaced transverse frame members 125 upon which crankshaft bearings 126 are mounted. A crankshaft 127 is rotatably supported in bearings 126 and is, inturn, pivotally secured to connecting rods 128 by means of connecting rod bearings 129. The connecting rods 128 at their ends carry similar pistons 130 which are hollow and of substantially square cross-section, the juncture of the connecting rods and pistons being secured by means of wrist pins 131. The ram section 122 comprises two pistons 130 which are in 180 degree phase relationship to each other. The pistons 130 extend through the space 35 and move upwardly and downwardly in scraping contact with the lower hopper walls, as shown best in Fig. 10 wherein the lower hopper wall comprises the wall 8. The outer ends of the pistons 130 are substantially square and function, when the pistons are reciprocated to scrape the wall 8 and urge the material downwardly toward the discharge.

The central section 123 carries a platform 132 upon which an electric motor 133 is mounted, said motor being directly connected to a conventional gear reducer 134 having an output shaft 135. A spur gear 136 is mounted upon shaft 135 and meshes with a pinion 137 mounted upon ram drive shaft 138 which, in turn, is journaled in bearings 139. At one end, shaft 138 carries drive pinion 140 which meshes with drive gear 141 mounted upon crank shaft 127. Thus, the ram pistons 130 are reciprocated.

At the opposite end of the shaft 138 a pinion 142 is mounted which meshes with a drive gear 143 mounted upon the crankshaft 127 of the ram section 124. In this fashion both crankshafts are driven by motor 133. To operate the ram sections independently of each other, conventional clutches 144 and 145 are interposed between pinion 137 on shaft 138 and ram sections 122 and 124, respectively.

To move the combination carrier and ram unit 20 upon rails 37 and 38, a motor 146 is also mounted upon platform 132 at the central section of the carrier, said motor being adapted to drive gear reducer 147 having an output shaft 148. A gear 149 is mounted upon output shaft 148 and meshes with a rack 149 mounted upon frame members 150, comprising portions of the supporting frame for the hopper walls. Thus, the units 20 may be moved longitudinally of the hopper whereby the ram sections 122 and 124 are moved and the unit 18 is moved.

The central section 123 in addition to carrying the drive means for the rams and the translating means for the unit 18, may also function as a carrier for motor driven fluid pump 151 having pipe connections 152 which may connect with desired cylinders 65 and 120 of the agitating unit 18. The pump 151 may be driven by motor 153.

To prevent an undue thrust from being exerted upon the carrier units 20 when the piston 130 moves downwardly to scrape the walls of the hopper, a rail 154 (Figs. 9 and 10) may be mounted upon the lower surface of the hopper wall. A plurality of extension frame members 155 are carried by the carrier unit 20 adjacent sections 120 and 124, said frame members carrying rolls 156 which ride upon opposite faces of the rail 154. Thus, the downward thrust of the pistons 130 is resisted by the lowermost rollers 156 bearing upon rail 154 whereby the carrier unit 20 will not be tipped upon the rails 37 and 38.

In view of the fact that the pistons move in a direction lateral to their direction of thrust when the carrier unit is moved upon the rails 37 and 38, a baffle member 157 is mounted upon the carrier unit adjacent the endmost pistons 130. Hence, the pistons 130 are protected from the lateral force of the material in the hopper when the carrier unit moves along the length of the hopper.

Each of the hopper walls 6, 8, 10 and 12 are provided with a plurality of openings 158. A header 159 is positioned beneath each of said hopper walls and extends the length of said walls, said header being connected to a source of air, water or steam under pressure (not shown). At spaced intervals along the length of each header a branch pipe 160 connects into said header, a valve 161 being positioned in each branch pipe. Valves 161 are all of the normally closed type and each has a stem 162 which is spring pressed to closed position. Each branch pipe 160 connects at its opposite end into a pipeline 163 which carries an extension 164 having a nozzle 165 carried at its end which connects with each opening 158.

A rod 166 extends the length of the hopper and one such rod is positioned beneath each hopper wall 6, 8, 10 and 12. A plurality of levers 167 are pivotally mounted upon each rod, one adjacent each opening 158, each lever carrying at its free end a roller 168. A cam plate 169 is mounted upon the box frame 39 beneath each ram section 122 and 124, said plate being adapted to contact the rollers 168 and swing the levers 167 about the rod 166. A boss 170 is formed on each lever and said boss is adapted to make contact with and depress each valve stem 162 when the cam plate 169 depresses the levers 167. The cam plates 169 are curved at their opposite ends and are such length as to span a maximum of two rollers 168.

Thus when the carrier unit moves, the cam plates 169 depress adjacent levers 167 whereby selected valves 161 are opened. When said valves are opened, air, water or steam issues from the selected openings 158 and functions to lubricate and buoy up the material rendering it more easily displaceable by the pistons 130.

Each of the upper lateral walls 5, 6, 9 and 11 are also provided with a plurality of openings 171 into each of which a nozzle 172 extends. Each nozzle 172 is carried by an extension pipe 173 connected to each pipeline 160. Thus, when the carrier units 20 move and the valves 161 are selectively opened, air, water or steam issues also from the openings 171 and tends to lubricate and buoy the material adjacent walls 5, 7, 9 and 11 whereby displacement of said material is induced.

In utilizing the device heretofore described, the carrier units 20 move the agitating units 18 lengthwise throughout the hopper spaces 3 and 4. It will be noted particularly from Fig. 8 that the depending supporting members 43 are carried at substantially the central portions of the carrier units 20. Thus, the ram sections 122 and 124 are spaced in front of or to the rear of each unit 118. When the carrier units 20 and the unit 18 move in a predetermined direction through the hopper, the ram section 122 or 124, whichever is in front of the unit 18 is the operable section. By the selective manipulation of the clutches 144 or 145 the ram units at one end or the other end of the carrier 20 may be set into operation. As mentioned hereinbefore, the ram units which precede the agitating unit 18 becomes the operable unit and hence the material which may tend to adhere to the walls 6, 8, 10 and 12 is dislodged and urged toward the hopper bottom and this dislodging and urging action takes place in front of the onwardly advancing unit 18. Thus, the entire lower portion of the volume of the material carried in the hoppers is agitated, disrupted and urged toward the hopper discharge by the agitating unit and the ram units. In view of the fact that the cam plates 169 are disposed adjacent the ram units, the air, water or steam introduced into the hopper through the openings 158 and 171 further tend to condition the material in the hopper for free flow and ready removal.

In unloading certain types of materials from hoppers there is a tendency for the units, hereinbefore described, particularly unit 18, to undercut the mass of material as the unit proceeds through the hopper leaving overhanging ridges or ledges of cohering material. To break down said overhanging ridges and ledges the following described apparatus may be employed.

Carried by each of the depending supporting frame members 43, hereinbefore described, is a frame member 174 which comprises two spaced upwardly extending bearing portions 175. A recess 176 is provided between the bearing portions 174 in the lower portion of which a worm pinion 177 is journaled in bearings 178. An electric motor 179 is positioned in said recess and is connected to said worm pinion whereby the latter is driven.

A shaft 180 is carried by each pair of bearing portions 175 and a rocking element 181 is carried upon the shaft. The lower portion of the rocking element is of substantially semi-circular shape having a web 182 and reinforcing radially extending ribs 183. At the periphery of the web 182 a ring 184 is carried, the outer portion of said ring carrying teeth 185 which engage with the worm pinion 177, the arrangement being such that when the pinion is rotated by motor 179, the rocking element 181 is rotated about shaft 180.

As an integral portion of the rocking element 181 a tubular collar 186 extends radially from shaft 180, said tubular collar being positioned on the opposite side of the shaft from the ring gear 184. The collar 186 is of substantially rectangular cross-section and tapers inwardly in a radial direction away from shaft 180. A tubular extension 187 is secured at one end within the tubular collar 186 and extends radially outwardly from shaft 180, said extension being adapted to house a fluid-pressure cylinder 188 which, at one end, is pivotally connected to a lug 189 forming a part of the rocking element 181. A piston rod 190 reciprocates within cylinder 188 and is connected at its outer end to a wrist pin 191 carried by a reciprocating beam 192 which carries at its outer end a scraper 193.

The reciprocating beam 192 may comprise a built-up beam section comprising two I-beams 194 with joining panels 195. A pair of rails 196 are carried by two outer flanges of each I-beam, said rails being substantially coextensive in length with the beam 192. Two pairs of rollers 197 are carried upon the inner face of one side of the tubular extension 187, said pairs of rollers being spaced from each other. One roller 197 of each pair engages one rail 196 carried by one flange of an I-beam 194 and the other roller of each pair engages the opposite rail. Two pairs of similar rollers 198 are carried by the opposite wall of the tubular extension 187, said rollers being positioned relative to the rails carried by the other I-beam as has been hereinbefore described as to the relationship of the rollers 197 to their respective rails. Thus, the beam 192 during its reciprocation is guided by the engagement of the rollers 197 and 198 with the rails 196.

The scraper plate 193 may be of any desired shape such as the polygonal shape shown and is preferably reinforced by reinforcing ribs 199 or the like.

Figure 2:
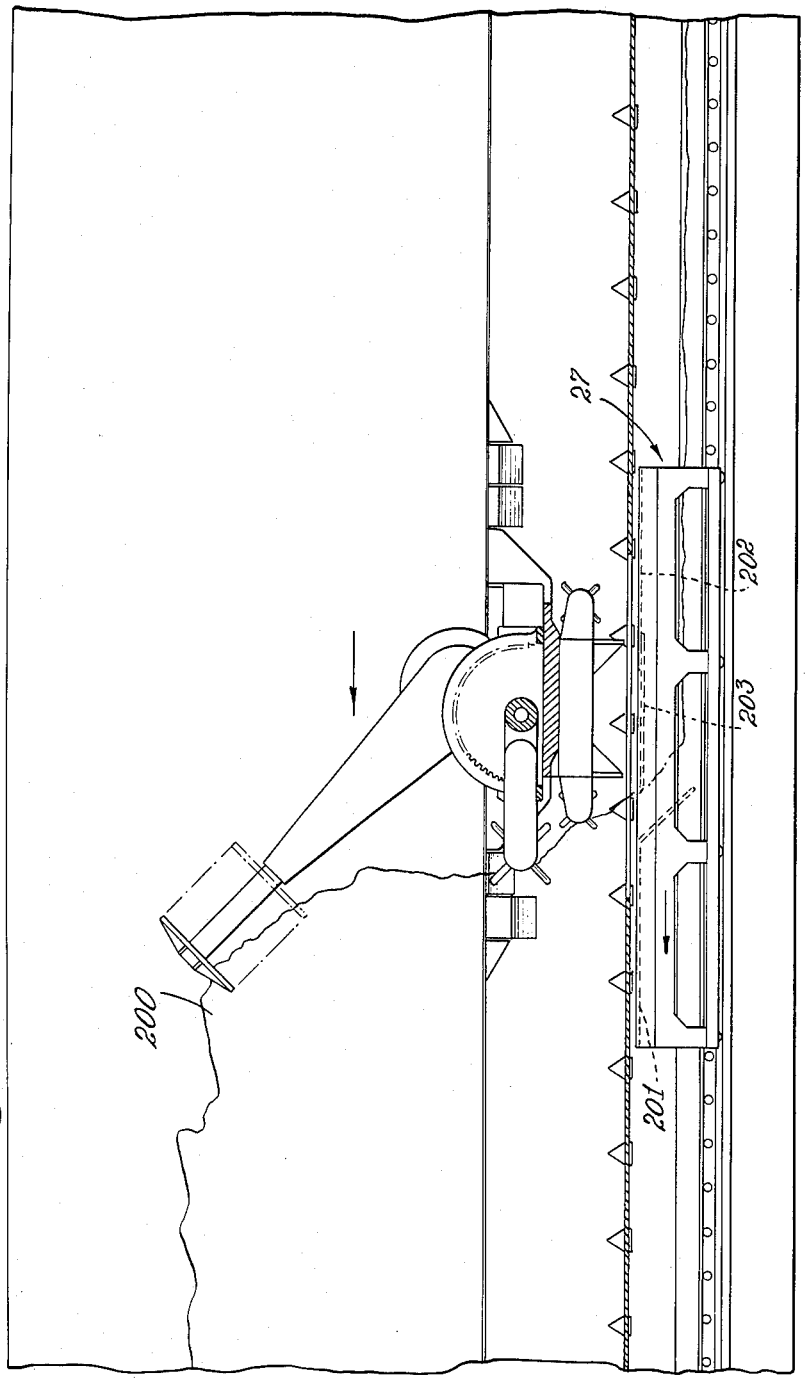
Fig. 2 is a sectional view taken on line 2—2 of Fig. 1.
Figure 3:
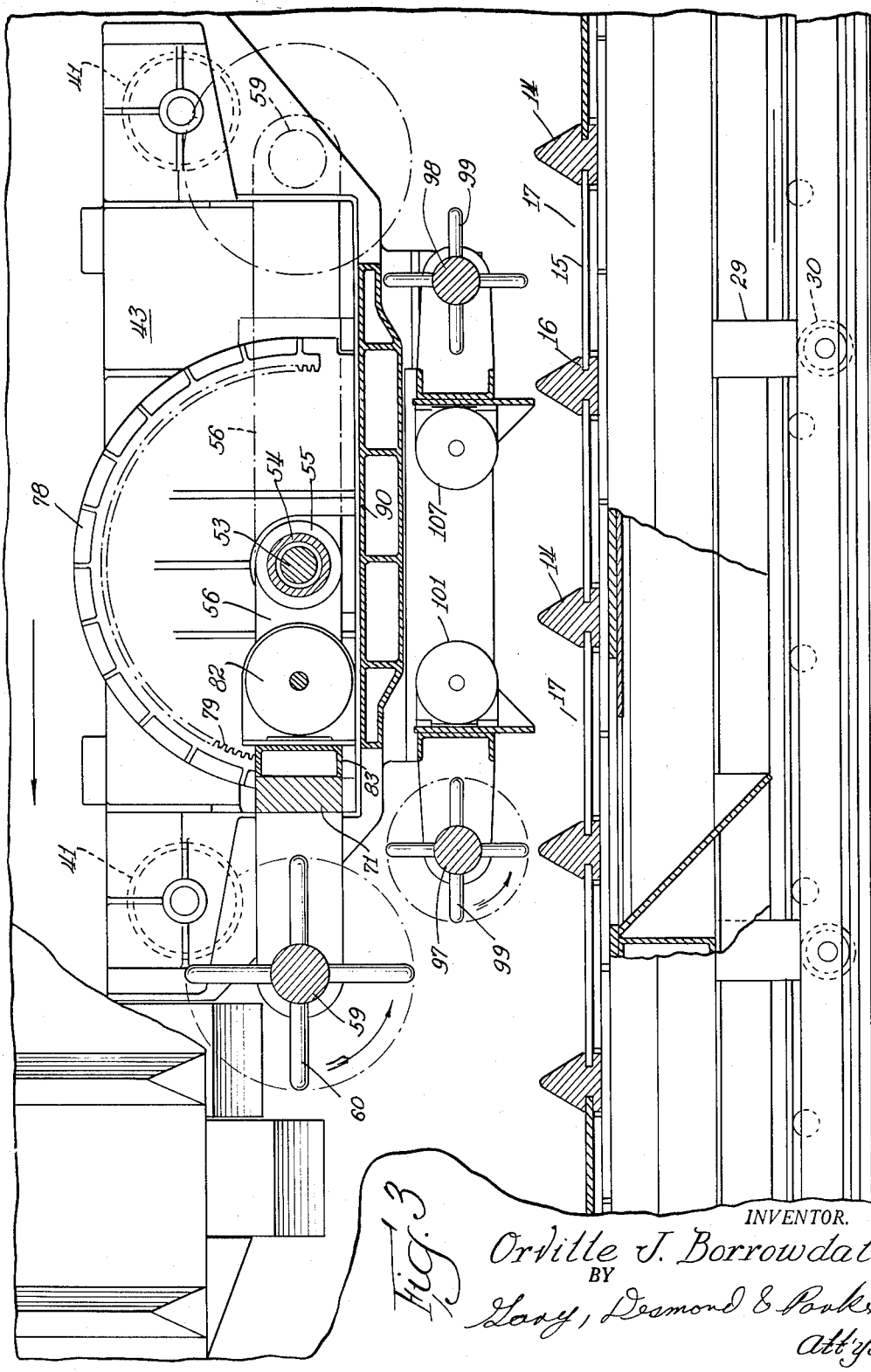
Fig. 3 is an enlarged sectional detailed view illustrating the device for agitating the material carried in the hopper taken on line 3—3 of Fig. 5.
Figure 4:
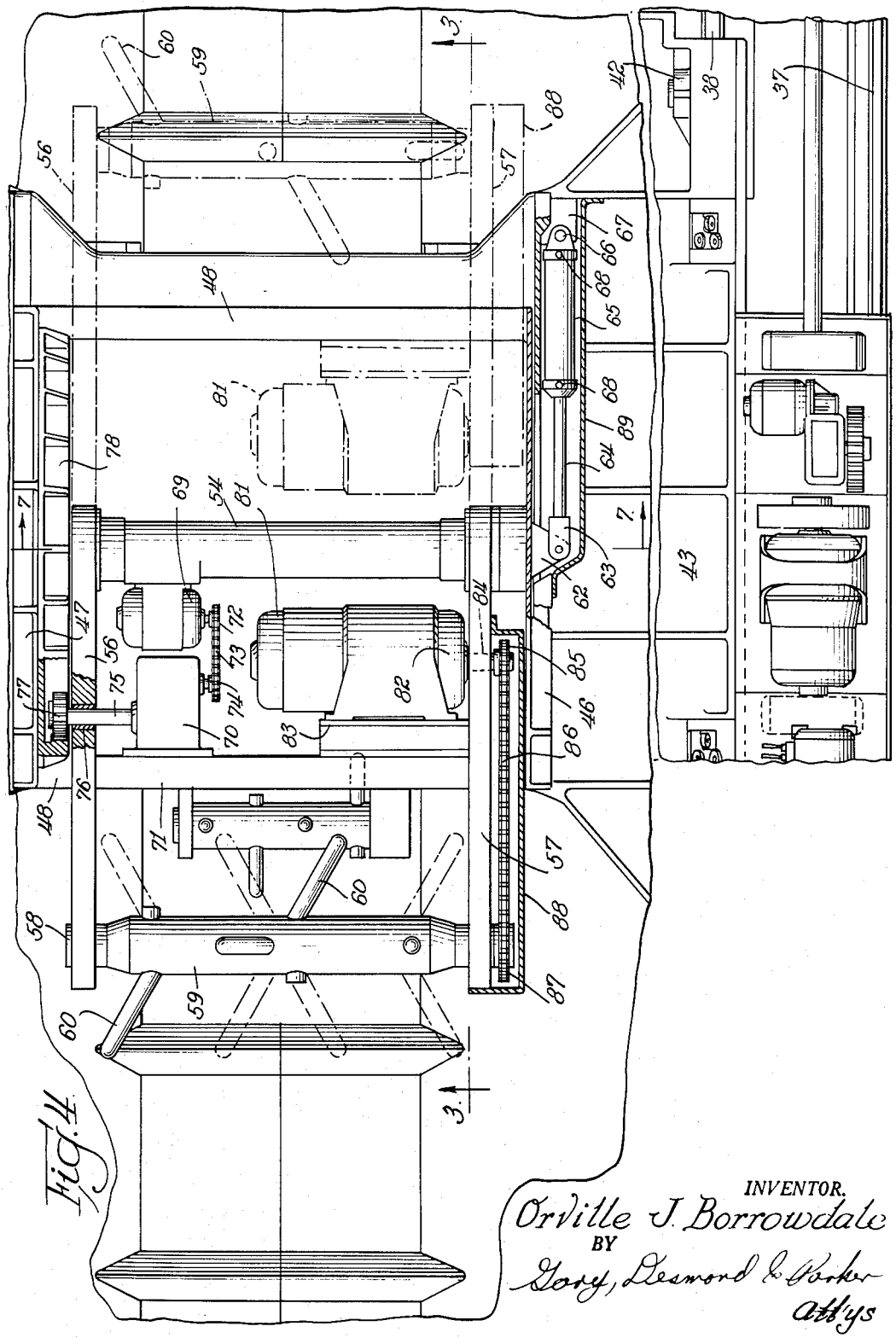
Fig. 4 is a top plan view of the device illustrated in Fig. 3.

In utilizing the device shown in detail in Figs. 11 to 14 inclusive, two units 21 associated with unit 18 and the tubular extensions 87 and reciprocating beams 192 are adapted to be rocked in a plane parallel to the longitudinal axis of the hopper. With the unit 18 moving in a predetermined direction through the hopper it can readily be seen, particularly from Fig. 2, that there is a possibility that the unit 18 will tend to undercut the material 19 and thereby leave a ledge 200. The units 21 may then be rocked forwardly by motors 179 and the beam 192 may be extended to its maximum distance by the proper introduction of fluid under pressure to the cylinders 188. Fluid under pressure may then be introduced to the opposite ends of the cylinders and the beams 192 may be drawn inwardly relative to the tubular extensions 187. It can readily be seen that this action tends to scrape the material 19 at the ledge or ridge 200 and cause said material to flow downwardly toward the unit 18 and thence downwardly through the hopper discharge. The reciprocating action of the beam 192 may be periodic whereby the ledge 200 may be entirely scraped away.

As has been hereinbefore described, a car 27 may be positioned beneath each of the hopper discharges 13. As shown best in Figs. 2 and 3 each car 27 may be provided with a relatively flat upper platform 201 at the forward end of the car and a relatively flat upper platform 202 at the rear portion of the car. Slidably secured to the rear platform 202 is a slidable platform 203 which may be employed to control the area of the opening between the platforms 201 and 202. Thus, an additional control of the feed of the material from the hopper to the conveyor belts beneath the hopper is provided by the slidable platform 203 of the car 27 since the rate of passage of the material from the hopper discharges through the car to the conveyor belt may be controlled by moving the slidable platform 203 to increase or decrease the area of the opening through the car.

It can readily be seen that herein is a device which facilitates, accelerates and controls the emptying of a ship cargo-carrying hopper, storage hopper or the like, means being provided for loosening the material at the lower central portion of the hopper and the side portions thereof and means being also provided for the breaking down or scraping overhanging ridges or ledges formed by undercutting the mass of material in the hopper. It is to be understood that many modifications of the present invention will suggest themselves to those skilled in the art which do not depart from the basic concepts hereof and hence, I do not wish to be limited except as necessitated by the appended claims.

I claim as my invention:

1. A device for facilitating the unloading of material from an elongated hopper having a substantially dihedral angular bottom portion through an elongated discharge provided in the bottom portion of the hopper adjacent the line of juncture of the planes of the dihedral walls comprising, a carrier positioned beneath a lateral wall of the hopper and movable lengthwise of said hopper, means for moving said carrier lengthwise of said hopper, supporting means mounted upon said carrier and projecting through an elongated opening in said last-mentioned dihedral wall into the lower portion of said hopper, said supporting means being movable with the carrier lengthwise through said hopper, and means carried by said supporting means within the hopper for agitating the material in the hopper to condition it for movement through the hopper discharge.

2. A device for facilitating the unloading of material from an elongated hopper having a substantially dihedral angular bottom portion through an elongated discharge provided in the bottom portion of the hopper adjacent the line of juncture of the planes of the dihedral walls comprising, a carrier positioned beneath a lateral wall of the hopper and movable lengthwise of said hopper, and means mounted upon said carrier and extending downwardly through an elongated opening in said last-mentioned dihedral wall positioned above said hopper discharge and substantially parallel thereto and into said hopper for displacing a portion of the material in the hopper to condition it for movement out of said discharge.

3. A device for facilitating the unloading of material from an elongated hopper through an elongated discharge provided at the bottom of the hopper, comprising a carrier movable lengthwise of said hopper, an agitator positioned in the body of the material in the hopper, means for supporting said agitator from said carrier in a position within said discharge, ram means mounted upon said carrier and movable in scraping relationship with the lateral wall of the hopper, and reciprocating scraper carried by said agitator-supporting means for scraping and dislodging an upper portion of the material in said hopper.

4. A device for facilitating the unloading of material from an elongated hopper through an elongated discharge provided at the bottom of the hopper, comprising a carrier movable lengthwise of said hopper in parallel relationship to said discharge, an agitator positioned in said hopper in the body of the material carried therein adjacent said discharge, means for actuating said agitator to disrupt and displace a portion of the material in the hopper, means for supporting said agitator from said carrier to move said agitator with the carrier, ram means mounted upon said carrier and movable in scraping relationship with a wall of the hopper, means carried by said carrier for actuating said ram means, and a reciprocating scraper carried by said agitator-supporting means for scraping and dislodging an upper portion of the material in said hopper.

5. A device for facilitating the unloading of material from an elongated hopper of substantially inverted triangular cross-section through an elongated discharge provided in the bottom of the hopper, comprising a carrier positioned beneath a lateral wall of the hopper and movable lengthwise of said hopper discharge, an agitator positioned in said hopper in the body of the material carried therein adjacent said discharge, means for actuating said agitator to disrupt and displace a portion of the mass of material in said hopper, means carried by said carrier and projecting through an elongated opening provided in said lateral wall of the hopper for supporting said agitator from said carrier to move the agitator with the carrier, ram means mounted upon the carrier and movable through the opening in the hopper wall into scraping relationship with the inner face of said lateral wall, means carried by said carrier for actuating said ram means, and a reciprocating scraper carried by said agitator-supporting means within said hopper for scraping and dislodging an upper portion of the material in said hopper.

6. A device for facilitating the unloading of material from an elongated hopper of substantially inverted triangular cross-section through an elongated discharge provided in the bottom of the hopper, comprising a pair of opposite carriers positioned beneath opposite lateral walls of the hopper and movable lengthwise of said hopper discharge, an agitator positioned in said hopper in the body of the material carried therein adjacent said discharge, means for actuating said agitator to disrupt and displace a portion of the mass of material in said hopper, means carried by said carriers and projecting through elongated openings in said opposite lateral walls of the hopper for supporting said agitator from said carriers to move the agitator with the carriers, ram means mounted upon each of said carriers and movable through the openings in the hopper walls into scraping relationship with the inner faces of said lateral walls, means carried by said carriers for actuating said ram means, and a reciprocating scraper carried by said agitator-supporting means within said hopper for scraping and dislodging an upper portion of the material in said hopper.

7. A device for facilitating the unloading of material from an elongated hopper which comprises a hopper having a downwardly and inwardly tapered lateral walls, each of said walls being constructed in a plurality of longitudinal sections with a portion of an upper section overlapping and spaced from a portion of a lower section, to provide an elongated opening in each of said lateral walls, said hopper being provided with an elongated discharge at its bottom, carriers movably positioned exteriorly of said lateral walls, means for moving said carriers substantially parallel to the elongated openings in said lateral walls, means positioned within the mass of material in the hopper for disrupting said material and conditioning it for flow through the hopper discharge, and supporting means extending from said carrier through said elongated wall openings for supporting said disrupting means and moving it lengthwise through the hopper with movement of said carriers.

8. A device for facilitating the unloading of material from an elongated hopper which comprises a hopper having downwardly and inwardly tapered lateral walls, each of said walls being constructed in a plurality of longitudinal sections with a portion of an upper section overlapping and spaced from a portion of a lower section, to provide an elongated opening in each of said lateral walls, said hopper being provided with an elongated discharge at its bottom disposed substantially parallel to said elongated openings, carriers movably positioned exteriorly of said lateral walls, means for moving said carriers substantially parallel to the elongated openings in said lateral walls, means carried by said carriers and movably positioned in said hopper through said lateral wall openings for displacing a portion of the material in the hopper and conditioning it for flow out of said hopper discharge, said last-mentioned means being movable with said carriers lengthwise through said hopper.

9. A device for facilitating the unloading of material from an elongated hopper of substantially inverted triangular cross-section through an elongated discharge provided in the bottom of the hopper comprising a carrier positioned beneath a lateral wall of the hopper and movable lengthwise of said hopper, and means mounted upon said carrier and extending through an elongated opening in said lateral wall into said hopper for displacing a portion of the material in the hopper to condition it for movement out of said discharge, said means comprising a piston reciprocably movable through said elongated opening transverse to said opening in plane-parallel relationship to said lateral wall.

10. A device for facilitating the unloading of material from an elongated hopper of substantially inverted triangular cross-section through an elongated discharge provided in the bottom of the hopper comprising a carrier positioned beneath a lateral wall of the hopper and movable lengthwise of said hopper, means mounted upon said carrier and extending through an elongated opening in said lateral wall into said hopper for displacing a portion of the material in the hopper to condition it for movement out of said discharge, said means comprising a piston reciprocably movable through said elongated opening transverse to said opening in plane-parallel relationship to said lateral wall, and means mounted upon said carrier for moving said carrier and piston lengthwise of said hopper.

11. A device for facilitating the unloading of material from an elongated hopper of substantially inverted triangular cross-section through an elongated discharge provided in the bottom of the hopper and movable lengthwise of said hopper, means mounted upon said carrier and extending through an elongated opening in said lateral wall into said hopper for displacing a portion of the material in the hopper to condition it for movement out of said discharge, said means comprising a piston reciprocably movable through said elongated opening transverse to said opening in plane-parallel relationship to said later wall, means mounted upon said carrier for moving said carrier and piston lengthwise of said hopper, and means mounted upon said carrier for reciprocating said piston.

12. A device for facilitating the unloading of material from an elongated hopper of substantially inverted triangular cross-section through an elongated discharge provided in the bottom of the hopper and disposed substantially parallel to the length of the hopper, comprising, a carrier positioned beneath each opposite outer lateral wall of the hopper and movable lengthwise of said hopper, means mounted upon each carrier for moving said carriers lengthwise of said hopper, means mounted upon each of said carriers and extending through elongated openings disposed substantially parallel to the length of said hopper in said opposite outer lateral walls and into said hopper for displacing a portion of the material in the hopper to condition it for movement out of said discharge, and means for preventing egress of material from said hopper through said elongated openings.

13. A device for facilitating the unloading of material from an elongated hopper of substantially inverted triangular cross-section through an elongated discharge provided in the bottom of the hopper comprising, a carrier positioned beneath opposite lateral walls of the hopper and movable lengthwise of said hopper, means mounted upon said carrier for moving said carriers lengthwise of said hopper, means mounted upon each of said carriers and extending through elongated openings in said opposite lateral walls into said hopper for displacing a portion of the material in the hopper to condition it for movement out of said discharge, said means comprising a plurality of pistons reciprocably movable through said elongated openings in plane-parallel relationship to the inner surfaces of said lateral walls, and means mounted upon said carriers for reciprocating said pistons.

14. A device for facilitating the unloading of material from an elongated hopper having opposite outer lateral walls through an elongated discharge provided in the bottom of the hopper comprising, a carrier positioned adjacent an outer surface of an outer lateral wall of the hopper and movable lengthwise of said hopper, means for moving said carrier lengthwise of said hopper, supporting means mounted upon said carrier and projecting through an elongated opening in said outer lateral wall into said hopper adjacent the discharge thereof, said supporting means being movable with the carrier lengthwise through said hopper, movable means carried by said supporting means within the hopper for agitating the material in the hopper, and means carried by said supporting means for actuating said movable means.

15. A device for facilitating the unloading of material from an elongated hopper through an elongated discharge provided in the bottom of the hopper comprising, a carrier positioned adjacent an outer surface of a lateral wall of the hopper and movable lengthwise of said hopper, means for moving said carrier lengthwise of said hopper, supporting means mounted upon said carrier and projecting through an elongated opening in said lateral wall into said hopper adjacent the discharge thereof, said supporting means being movable with the carrier lengthwise through said hopper, rotatable means carried by said supporting means within the hopper for agitating the material in the hopper, and means carried by said supporting means for actuating said rotatable means.

16. A device for facilitating the unloading of material from an elongated hopper of substantially inverted triangular cross-section through an elongated discharge provided in the bottom of the hopper comprising, a carrier positioned beneath each opposite lateral wall of the hopper and movable lengthwise of said hopper, means for moving said carriers lengthwise of said hopper, a depending supporting frame mounted at its opposite ends upon said carriers and projecting through elongated openings in said opposite lateral walls into said hopper, said supporting means being movable with the carriers lengthwise through said hopper, and means carried by said supporting frame within the hopper immediately above said discharge for agitating the material in the hopper and urging it through the hopper dscharge.

17. A device for facilitating the unloading of material from an elongated hopper of substantially inverted triangular cross-section through an elongated discharge provided in the bottom of the hopper comprising, a carrier positioned beneath each opposite lateral wall of the hopper and movable lengthwise of said hopper, means for moving said carriers lengthwise of said hopper, a depending substantially U-shaped supporting frame mounted at its opposite ends upon said carriers and projecting through elongated openings in said opposite lateral walls into said hopper, said supporting means being movable with the carriers lengthwise through said hopper, and means carried by said supporting frame within the hopper immediately above said discharge for agitating the material in the hopper and urging it through the hopper discharge.

18. A device for facilitating the unloading of material from an elongated hopper of substantially inverted triangular cross-section through an elongated discharge provided in the bottom of the hopper comprising, a carrier positioned beneath a lateral wall of the hopper and movable lengthwise of said hopper, means for moving said carrier lengthwise of said hopper, supporting means mounted upon said carrier and projecting through an elongated opening in said lateral wall into said hopper, said supporting means being movable with the carrier lengthwise through said hopper, and means carried by said supporting means within the hopper for scraping the material in the hopper toward said discharge, said means comprising a tubular guide member, a scraper head reciprocably mounted on said guide member, and means for reciprocating said scraper head.

References Cited in the file of this patent

FOREIGN PATENTS

| 476,247 | Germany | May 14, 1929 |
| 500,497 | Germany | June 21, 1930 |